United States Patent [19]
Goldyn

[11] Patent Number: 5,802,962
[45] Date of Patent: Sep. 8, 1998

[54] OUTDOOR ADJUSTABLE GRILL

[76] Inventor: Robert Goldyn, 9941 122nd Street, Surrey, British Columbia, Canada, V3V 4M2

[21] Appl. No.: 18,998

[22] Filed: Feb. 5, 1998

[51] Int. Cl.$^6$ .............................. A47J 33/00; A47J 37/04; A47J 37/07; F24B 3/00
[52] U.S. Cl. ........................ 99/421 H; 99/419; 99/448; 99/449; 126/25 R; 126/30
[58] Field of Search .................... 99/419–421 V, 99/448–450, 481, 482, 357; 126/30, 25 R, 25 A, 29, 26, 9 R, 9 B; 248/165, 168, 156, 122, 125, 296; 211/186, 189; D7/337

[56] References Cited

U.S. PATENT DOCUMENTS

| | | | |
|---|---|---|---|
| D. 356,005 | 3/1995 | Goble | D7/337 |
| 829,977 | 5/1906 | Valentine | 126/9 R |
| 2,811,099 | 10/1957 | McGoldrick | 99/421 H |
| 3,946,653 | 3/1976 | Pugh | 99/340 |
| 4,011,804 | 3/1977 | Crockett, Sr. | 99/421 H |
| 4,109,567 | 8/1978 | Gage et al. | 99/450 |
| 4,393,857 | 7/1983 | Sanford | 126/9 R |
| 4,815,367 | 3/1989 | Hanson et al. | 99/421 H |
| 4,856,423 | 8/1989 | Burns | 99/449 X |
| 5,025,715 | 6/1991 | Sir | 99/421 HV |
| 5,117,806 | 6/1992 | Soat | 126/29 |
| 5,287,844 | 2/1994 | Fieber | 126/30 |
| 5,452,706 | 9/1995 | Meza | 126/30 |

*Primary Examiner*—Timothy F. Simone

[57] ABSTRACT

A new outdoor adjustable grill for grilling over an open wood fire with numerous options. The inventive device includes a circular grill portion having four circular sleeves secured to an outer periphery thereof. The four circular sleeves are disposed at ninety degree intervals. The circular sleeves have open upper and lower ends. The open lower ends are internally threaded. Four leg portions are provided with each having threaded upper ends. The threaded upper ends couple with the open lower ends of the circular sleeves for elevating the circular grill portion above a recipient surface. A pair of forked posts are provided with each having lower ends. The lower end of the forked posts are received within the open upper ends of diametrically opposed circular sleeves. A crank spit extends between upper forked ends of the pair of forked posts. One end of the crank spit has a handle disposed thereon. The crank spit has a pair of claws disposed thereon in a facing relationship.

4 Claims, 3 Drawing Sheets

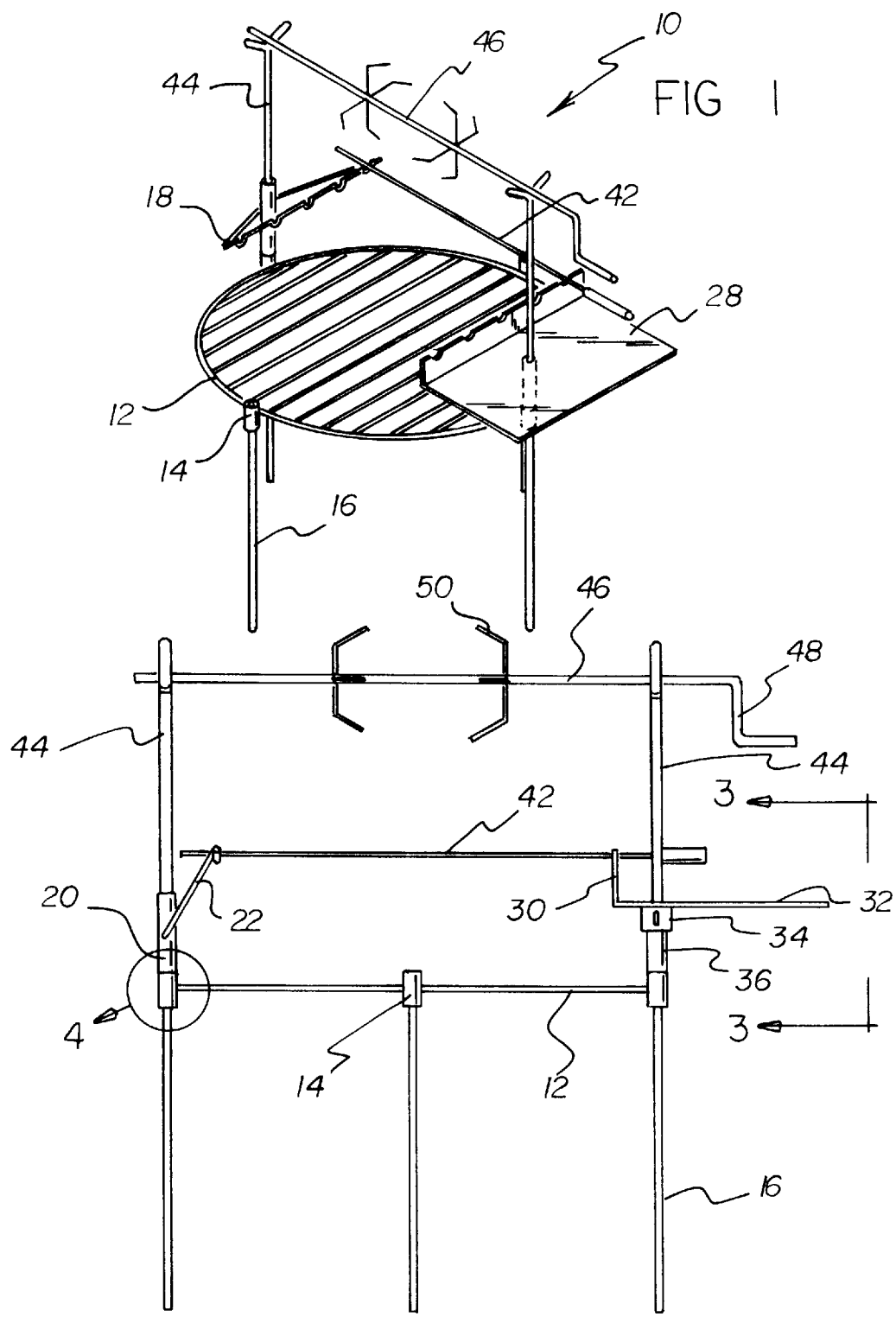

OUTDOOR ADJUSTABLE GRILL

BACKGROUND OF THE INVENTION

1. Field of the Invention

The present invention relates to barbecue grills and more particularly pertains to a new outdoor adjustable grill for grilling over an open wood fire with numerous options.

2. Description of the Prior Art

The use of barbecue grills is known in the prior art. More specifically, barbecue grills heretofore devised and utilized are known to consist basically of familiar, expected and obvious structural configurations, notwithstanding the myriad of designs encompassed by the crowded prior art which have been developed for the fulfillment of countless objectives and requirements.

Known prior art barbecue grills include U.S. Pat. No. 5,117,806 to Soat; U.S. Pat. No. 5,287,844 to Fieber; U.S. Pat. No. 4,856,423 to Burns; U.S. Pat. No. 4,829,977 to Valentine; U.S. Pat. No. 4,011,804 to Crockett, Sr.; and U.S. Pat. No. Des. 356,005 to Goble.

While these devices fulfill their respective, particular objectives and requirements, the aforementioned patents do not disclose a new outdoor adjustable grill. The inventive device includes a circular grill portion having four circular sleeves secured to an outer periphery thereof. The four circular sleeves are disposed at ninety degree intervals. The circular sleeves have open upper and lower ends. The open lower ends are internally threaded. Four leg portions are provided with each having threaded upper ends. The threaded upper ends couple with the open lower ends of the circular sleeves for elevating the circular grill portion above a recipient surface. A pair of forked posts are provided with each having lower ends. The lower end of the forked posts are received within the open upper ends of diametrically opposed circular sleeves. A crank spit extends between upper forked ends of the pair of forked posts. One end of the crank spit has a handle disposed thereon. The crank spit has a pair of claws disposed thereon in a facing relationship.

In these respects, the outdoor adjustable grill according to the present invention substantially departs from the conventional concepts and designs of the prior art, and in so doing provides an apparatus primarily developed for the purpose of grilling over an open wood fire with numerous options.

SUMMARY OF THE INVENTION

In view of the foregoing disadvantages inherent in the known types of barbecue grills now present in the prior art, the present invention provides a new outdoor adjustable grill construction wherein the same can be utilized for grilling over an open wood fire with numerous options.

The general purpose of the present invention, which will be described subsequently in greater detail, is to provide a new outdoor adjustable grill apparatus and method which has many of the advantages of the barbecue grills mentioned heretofore and many novel features that result in a new outdoor adjustable grill which is not anticipated, rendered obvious, suggested, or even implied by any of the prior art barbecue grills, either alone or in any combination thereof.

To attain this, the present invention generally comprises a circular grill portion having four circular sleeves secured to an outer periphery thereof. The four circular sleeves are disposed at ninety degree intervals. The circular sleeves have open upper and lower ends. The open lower ends are internally threaded. Four leg portions are provided with each having threaded upper ends. The threaded upper ends couple with the open lower ends of the circular sleeves for elevating the circular grill portion above a recipient surface. A skewer assembly is provided having a cylindrical tube extending downwardly therefrom. A lower end of the cylindrical tube is received within the open upper end of one of the circular sleeves. The cylindrical tube has an open upper end. The cylindrical tube has a pair of arms extending upwardly in an angular relationship thereto. The pair of arms have a horizontal arm extending therebetween. The horizontal arm has a plurality of notches formed therein. A heat guard assembly is provided having an L-shaped configuration. The heat guard assembly has an inner vertical plate and an outer horizontal plate. The outer horizontal plate has an aperture therethrough. The outer horizontal plate has a cylindrical sleeve extending downwardly therefrom in communication with the aperture. The cylindrical sleeve has a cylindrical tube extending outwardly of an open lower end thereof. A set screw extends through the cylindrical sleeve for engaging the cylindrical tube. A lower end of the cylindrical tube is received within the open upper end of one of the circular sleeves diametrically opposed from the skewer assembly. The inner vertical plate has a plurality of notches formed therein. The plurality of notches of the inner vertical plate are aligned with the plurality of notches of the skewer assembly to allow a plurality of skewers to transverse therebetween. A pair of forked posts are provided with each having lower ends. The lower end of one of the forked posts is received within the open upper end of the cylindrical tube of the skewer assembly. The lower end of an opposed fork post is received within the aperture and the cylindrical sleeve of the heat guard assembly. A crank spit extends between upper forked ends of the pair of forked posts. One end of the crank spit has a handle disposed thereon positioned above the heat guard assembly. The crank spit has a pair of claws disposed thereon in a facing relationship.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent No. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new outdoor adjustable grill apparatus and method which has many of the advantages of the barbecue grills mentioned heretofore and many novel features that result in a new outdoor adjustable grill which is not anticipated, rendered obvious, suggested, or even implied by any of the prior art barbecue grills, either alone or in any combination thereof.

It is another object of the present invention to provide a new outdoor adjustable grill which may be easily and efficiently manufactured and marketed.

It is a further object of the present invention to provide a new outdoor adjustable grill which is of a durable and reliable construction.

An even further object of the present invention is to provide a new outdoor adjustable grill which is susceptible of a low cost of manufacture with regard to both materials and labor, and which accordingly is then susceptible of low prices of sale to the consuming public, thereby making such outdoor adjustable grill economically available to the buying public.

Still yet another object of the present invention is to provide a new outdoor adjustable grill which provides in the apparatuses and methods of the prior art some of the advantages thereof, while simultaneously overcoming some of the disadvantages normally associated therewith.

Still another object of the present invention is to provide a new outdoor adjustable grill for grilling over an open wood fire with numerous options.

Yet another object of the present invention is to provide a new outdoor adjustable grill which includes a circular grill portion having four circular sleeves secured to an outer periphery thereof. The four circular sleeves are disposed at ninety degree intervals. The circular sleeves have open upper and lower ends. The open lower ends are internally threaded. Four leg portions are provided with each having threaded upper ends. The threaded upper ends couple with the open lower ends of the circular sleeves for elevating the circular grill portion above a recipient surface. A pair of forked posts are provided with each having lower ends. The lower end of the forked posts are received within the open upper ends of diametrically opposed circular sleeves. A crank spit extends between upper forked ends of the pair of forked posts. One end of the crank spit has a handle disposed thereon. The crank spit has a pair of claws disposed thereon in a facing relationship.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new outdoor adjustable grill according to the present invention.

FIG. 2 is a front elevation view of the present invention.

DESCRIPTION OF THE PREFERRED EMBODIMENT

Figure 3:
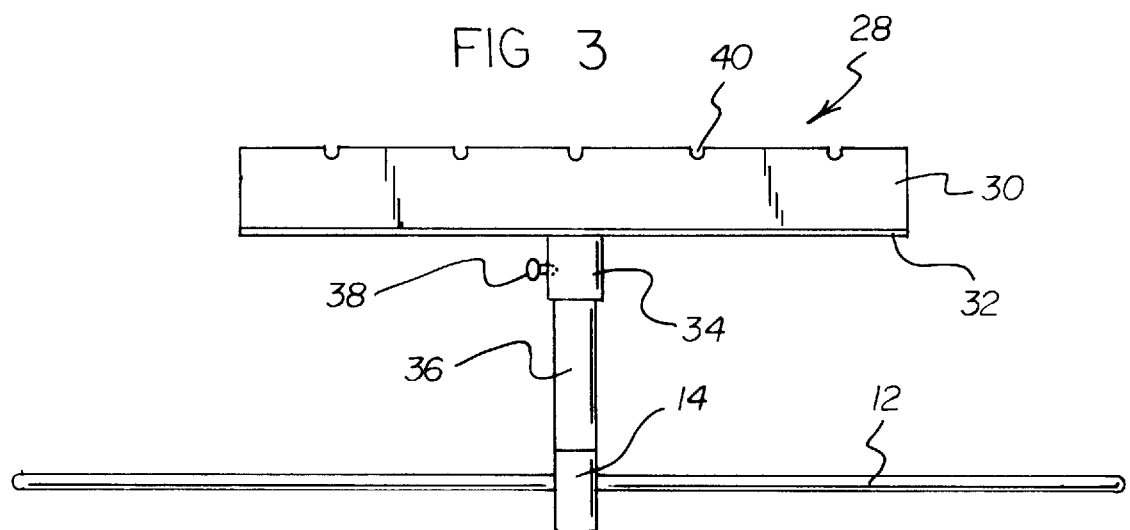
FIG. 3 is a side view of the present invention as taken along line 3—3 of FIG. 1.
Figure 4:
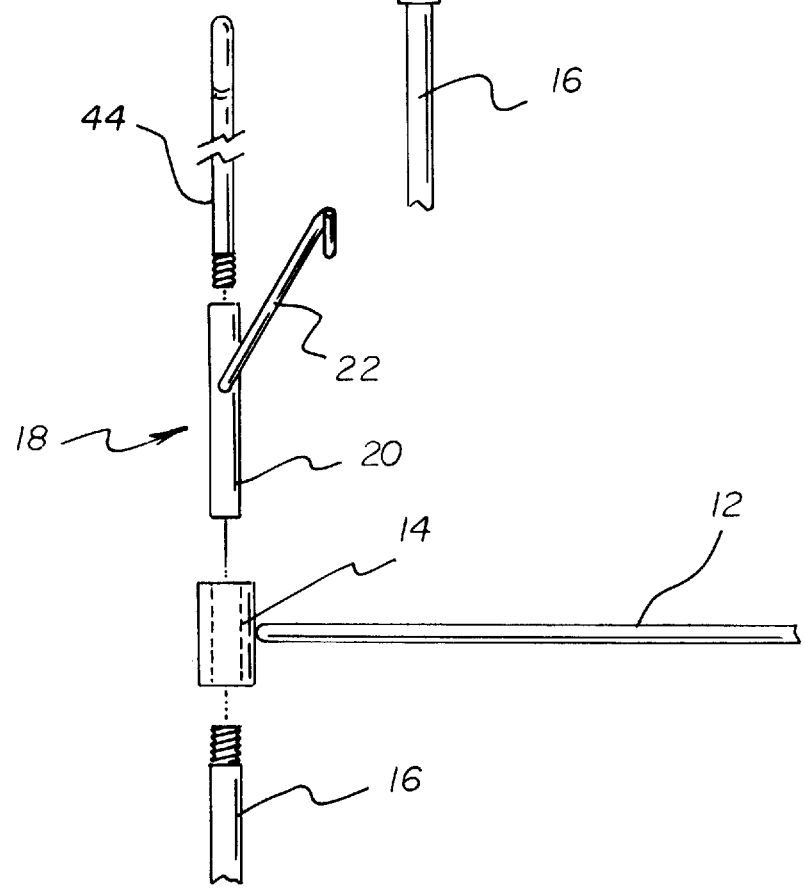
FIG. 4 is an exploded view of the present invention as taken from circle 4 of FIG. 2.

With reference now to the drawings, and in particular to FIGS. 1 through 6 thereof, a new outdoor adjustable grill embodying the principles and concepts of the present invention and generally designated by the reference numeral 10 will be described.

As best illustrated in FIGS. 1 through 6, the outdoor adjustable grill 10 comprises a circular grill portion 12 having four circular sleeves 14 secured to an outer periphery thereof. The four circular sleeves 14 are disposed at ninety degree intervals. The circular sleeves 14 have open upper and lower ends. The open lower ends are internally threaded.

Four leg portions 16 are provided with each having threaded upper ends. The threaded upper ends couple with the open lower ends of the circular sleeves 14 for elevating the circular grill portion 12 above a recipient surface. Lower ends of the four leg portions 16 would be inserted into the ground, mud, or sand.

Figure 5:
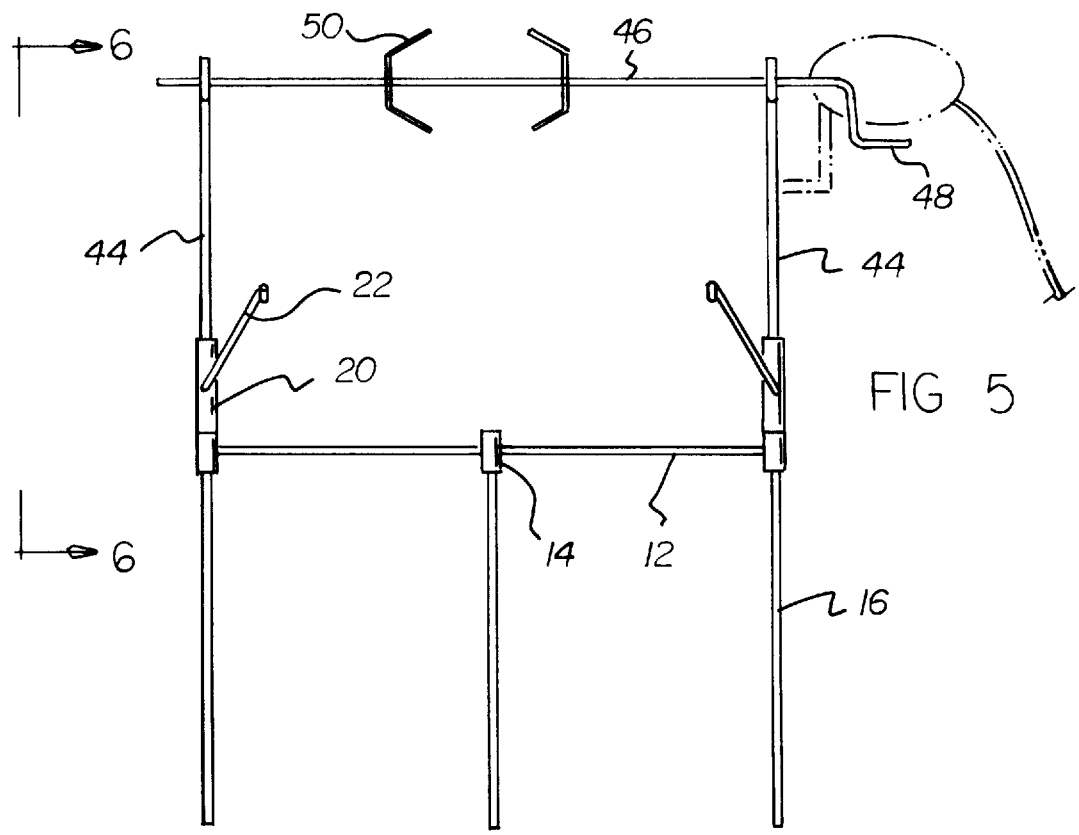
FIG. 5 is a front view of a second embodiment of the present invention.
Figure 6:
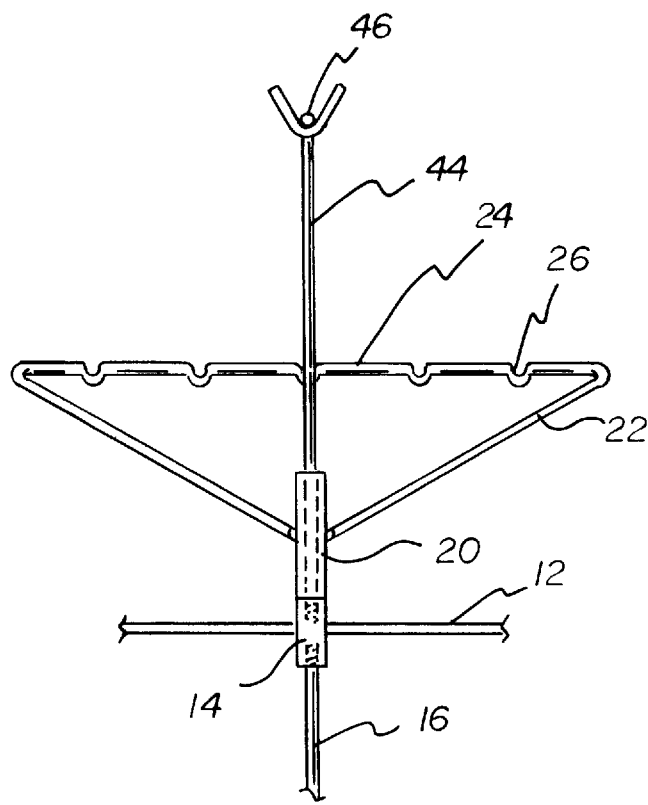
FIG. 6 is a side view of the present invention as taken along line 6—6 of FIG. 5.

A skewer assembly 18 is provided having a cylindrical tube 20 extending downwardly therefrom. A lower end of the cylindrical tube 20 is received within the open upper end of one of the circular sleeves 14. The cylindrical tube 20 has an open upper end. The cylindrical tube 20 has a pair of arms 22 extending upwardly in an angular relationship thereto. The pair of arms 22 have a horizontal arm 24 extending therebetween. The horizontal arm 24 has a plurality of notches 26 formed therein. FIG. 5 illustrates an alternate embodiment wherein a pair of skewer assemblies 18 are used in a diametrically opposed relationship.

A heat guard assembly 28 is provided having an L-shaped configuration. The heat guard assembly 28 has an inner vertical plate 30 and an outer horizontal plate 32. The outer horizontal plate 32 has an aperture therethrough. The outer horizontal plate 32 has a cylindrical sleeve 34 extending downwardly therefrom in communication with the aperture. The cylindrical sleeve 34 has a cylindrical tube 36 extending outwardly of an open lower end thereof. A set screw 38 extends through the cylindrical sleeve 34 for engaging the cylindrical tube 36. A lower end of the cylindrical tube 36 is received within the open upper end of one of the circular sleeves 14 diametrically opposed from the skewer assembly 18. The inner vertical plate 30 has a plurality of notches 40 formed therein. The plurality of notches 40 of the inner vertical plate 30 are aligned with the plurality of notches 26 of the skewer assembly to 18 allow a plurality of skewers 42 to transverse therebetween. The heat guard assembly 28 would protect a user from being exposed from flames while cooking. Handled ends of the plurality of skewers 42 would be disposed above the outer horizontal plate 32 for easy handling. The heat guard assembly 28 would absorb most of the heat from the fire thereby exposing the user to little discomfort from the heat.

A pair of forked posts 44 are provided with each having lower ends. The lower end of one of the forked posts 44 is received within the open upper end of the cylindrical tube 20 of the skewer assembly 18. The lower end of an opposed fork post 44 is received within the aperture and the cylindrical sleeve 34 of the heat guard assembly 28.

A crank spit 46 extends between upper forked ends of the pair of forked posts 44. One end of the crank spit 46 has a handle 48 disposed thereon positioned above the heat guard assembly 28. The crank spit 46 has a pair of claws 50 disposed thereon in a facing relationship. The handle 48 of the crank spit 46 is elevated above the outer horizontal plate 32 of the heat guard assembly 28 to allow the user to manipulate the handle 48 without risk of being burned or suffer from exposure to the heat from the fire.

In use, the present invention is a specially designed barbecue grill that would be used to grill foods over an open wood fire.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An outdoor adjustable grill for grilling over an open wood fire with numerous options comprising, in combination:
   a circular grill portion having four circular sleeves secured to an outer periphery thereof, the four circular sleeves being disposed at ninety degree intervals, the circular sleeves having open upper and lower ends, the open lower ends being internally threaded;
   four leg portions each having threaded upper ends, the threaded upper ends coupling with the open lower ends of the circular sleeves for elevating the circular grill portion above a recipient surface;
   a skewer assembly having a cylindrical tube extending downwardly therefrom, a lower end of the cylindrical tube received within the open upper end of one of the circular sleeves, the cylindrical tube having an open upper end, the cylindrical tube having a pair of arms extending upwardly in an angular relationship thereto, the pair of arms having a horizontal arm extending therebetween, the horizontal arm having a plurality of notches formed therein;
   a heat guard assembly having an L-shaped configuration, the heat guard assembly having an inner vertical plate and an outer horizontal plate, the outer horizontal plate having an aperture therethrough, the outer horizontal plate having a cylindrical sleeve extending downwardly therefrom in communication with the aperture, the cylindrical sleeve having a cylindrical tube extending outwardly of an open lower end thereof, a set screw extending through the cylindrical sleeve for engaging the cylindrical tube, a lower end of the cylindrical tube received within the open upper end of one of the circular sleeves diametrically opposed from the skewer assembly, the inner vertical plate having a plurality of notches formed therein, the plurality of notches of the inner vertical plate being aligned with the plurality of notches of the skewer assembly to allow a plurality of skewers to transverse therebetween;
   a pair of forked posts each having lower ends, the lower end of one of the forked posts received within the open upper end of the cylindrical tube of the skewer assembly, the lower end of an opposed fork post received within the aperture and the cylindrical sleeve of the heat guard assembly; and
   a crank spit extending between upper forked ends of the pair of forked posts, one end of the crank spit having a handle disposed thereon positioned above the heat guard assembly, the crank spit having a pair of claws disposed thereon in a facing relationship.

2. An outdoor adjustable grill for grilling over an open wood fire with numerous options comprising, in combination:
   a circular grill portion having four circular sleeves secured to an outer periphery thereof, the four circular sleeves being disposed at ninety degree intervals, the circular sleeves having open upper and lower ends, the open lower ends being internally threaded;
   four leg portions each having threaded upper ends, the threaded upper ends coupling with the open lower ends of the circular sleeves for elevating the circular grill portion above a recipient surface;
   a pair of forked posts each having lower ends, the lower end of the forked posts received within the open upper ends of diametrically opposed circular sleeves; and
   a crank spit extending between upper forked ends of the pair of forked posts, one end of the crank spit having a handle disposed thereon, the crank spit having a pair of claws disposed thereon in a facing relationship.

3. The outdoor adjustable grill as set forth in claim 2 and further including a skewer assembly having a cylindrical tube extending downwardly therefrom, a lower end of the cylindrical tube received within the open upper end of one of the circular sleeves, the cylindrical tube having an open upper end, the cylindrical tube having a pair of arms extending upwardly in an angular relationship thereto, the pair of arms having a horizontal arm extending therebetween, the horizontal arm having a plurality of notches formed therein.

4. The outdoor adjustable grill as set forth in claim 3 and further including a heat guard assembly having an L-shaped configuration, the heat guard assembly having an inner vertical plate and an outer horizontal plate, the outer horizontal plate having an aperture therethrough, the outer horizontal plate having a cylindrical sleeve extending downwardly therefrom in communication with the aperture, the cylindrical sleeve having a cylindrical tube extending outwardly of an open lower end thereof, a set screw extending through the cylindrical sleeve for engaging the cylindrical tube, a lower end of the cylindrical tube received within the open upper end of one of the circular sleeves diametrically opposed from the skewer assembly, the inner vertical plate having a plurality of notches formed therein, the plurality of notches of the inner vertical plate being aligned with the plurality of notches of the skewer assembly to allow a plurality of skewers to transverse therebetween.

* * * * *